G. D. SUNDSTRAND.
MILLING MACHINE.
APPLICATION FILED MAY 3, 1919.
1,425,717.
Patented Aug. 15, 1922.
2 SHEETS—SHEET 1.
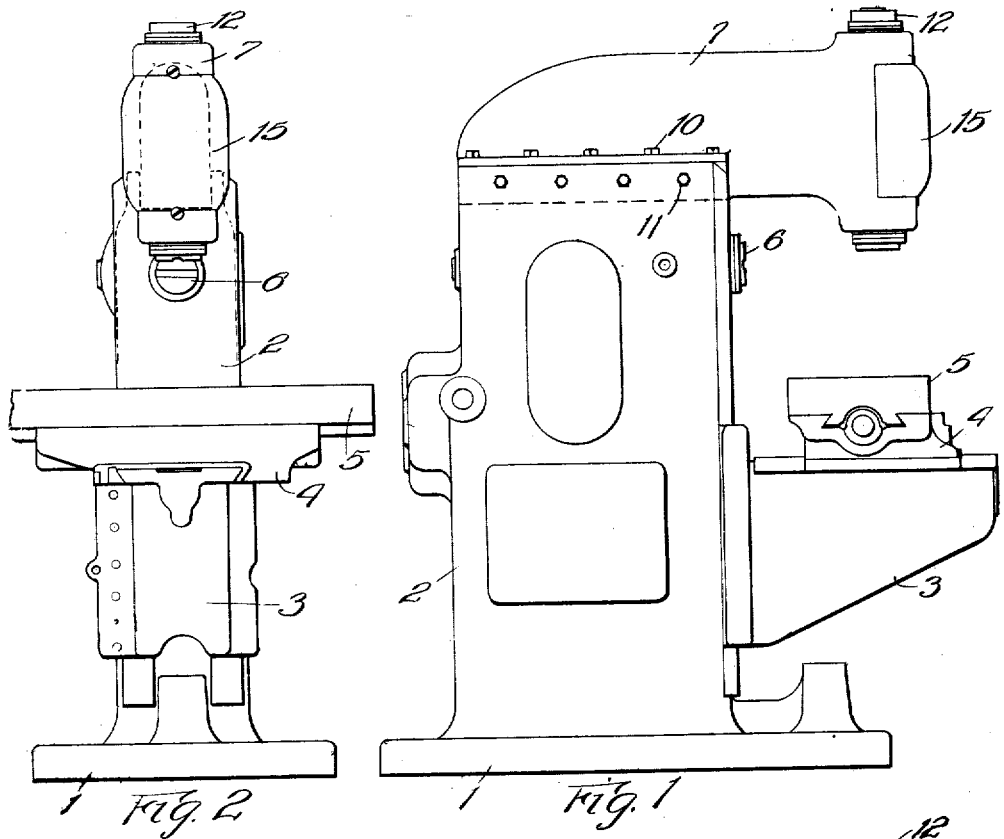
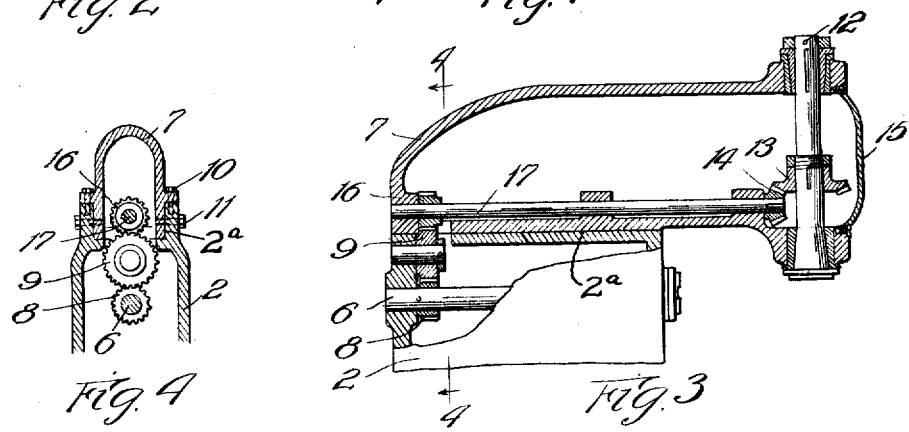
Inventor
G. D. Sundstrand
By Miller Chindahl + Parker
Attys G. D. SUNDSTRAND.
MILLING MACHINE.
APPLICATION FILED MAY 3, 1919.
1,425,717.
Patented Aug. 15, 1922.
2 SHEETS—SHEET 2.
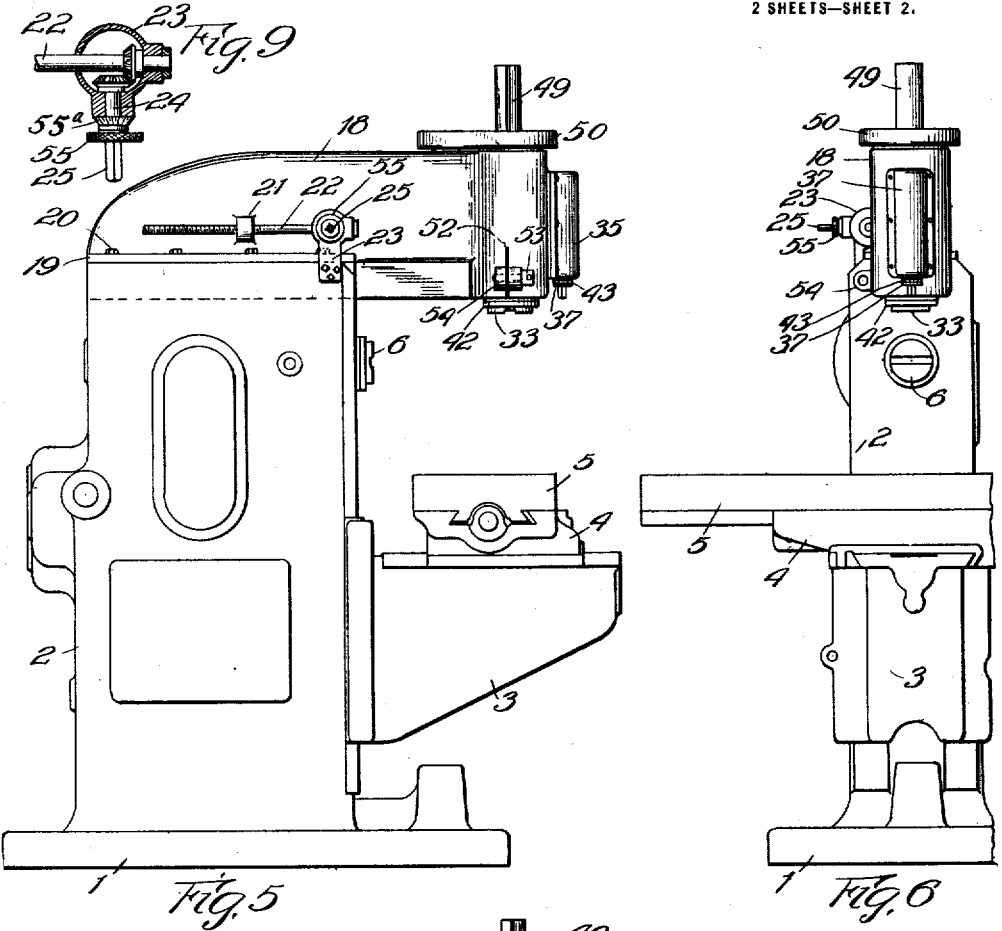
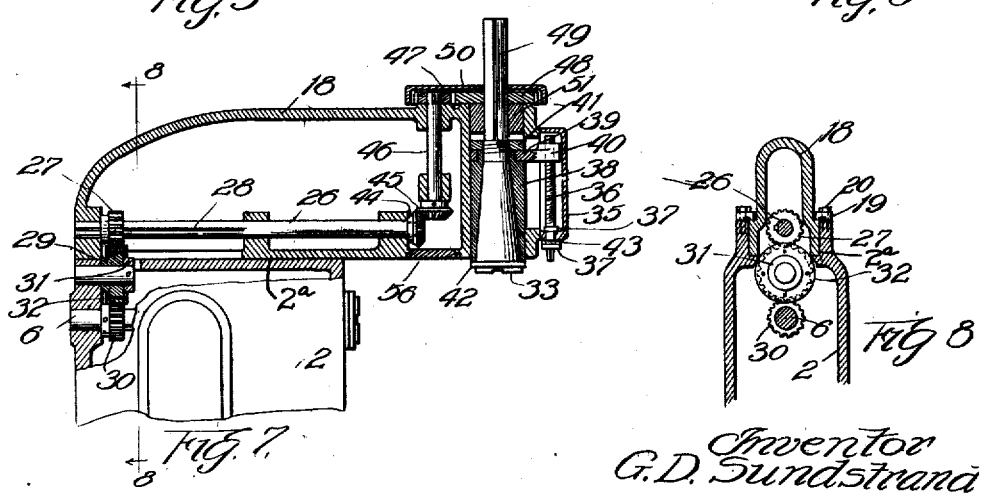
Inventor
G. D. Sundstrand
By Miller Chindahl Parker
Attys

UNITED STATES PATENT OFFICE.

GUSTAF DAVID SUNDSTRAND, OF ROCKFORD, ILLINOIS, ASSIGNOR TO ROCKFORD MILLING MACHINE COMPANY, OF ROCKFORD, ILLINOIS, A CORPORATION OF ILLINOIS.

MILLING MACHINE.

1,425,717.  Specification of Letters Patent.  Patented Aug. 15, 1922.

Application filed May 3, 1919. Serial No. 294,512.

*To all whom it may concern:*

Be it known that I, GUSTAF DAVID SUNDSTRAND, a citizen of the United States, residing at Rockford, in the county of Winnebago and State of Illinois, have invented certain new and useful Improvements in Milling Machines, of which the following is a specification.

My invention relates to milling machines and more specifically to a vertical milling attachment for such machines.

One of the objects of the invention is to provide a vertical milling attachment having a spindle operable simultaneously with the horizontal spindle without in any way interfering with the action of the latter.

Another object is to provide for complete adjustment of the vertical spindle in the attachment independent of the adjustment of the work and the horizontal spindle relative to each other.

Another object is to provide an attachment which may be readily and quickly mounted on a milling machine in place of the ordinary overarm.

Another object is to provide a connection between the vertical spindle and the source of power, said connection being established by simply putting the attachment in place and not interfering with the power drive to the horizontal spindle.

Another object is to provide a convenient means for independent adjustment of the position of the vertical spindle.

In the accompanying drawings—

Figure 1 is a side elevation of a milling machine showing the application of one form of my improved milling attachment thereto. Fig. 2 is a front elevation of the same machine. Fig. 3 is a side view of the attachment partly broken away to show the power transmission. Fig. 4 is a section on line 4—4 of Fig. 3. Fig. 5 is a side elevation of a milling machine showing a modified form of my improved attachment. Fig. 6 is a fragmental front end elevation of the same machine. Fig. 7 is a side view of the modified attachment broken away to show the power transmission. Fig. 8 is a sectional view on line 8—8 of Fig. 7, and Fig. 9 is a fragmental view showing the gearing for adjusting the longitudinal position of the attachment.

In the drawings, 1 indicates a suitable base, 2 a main vertical column, 3 a knee vertically adjustable on the column 2, 4 a saddle slidable toward and away from column 2 on the knee 3, and 5 a table horizontally slidable on the saddle 4 in a direction at right angles to the motion of the saddle. It will be seen that work mounted on 5 can be adjusted to any desired position within the limits of motion of the parts. As the above adjustment is practically universal in milling machines and in itself constitutes no part of the present invention, further details of description thereof are deemed unnecessary. The column 2 (see Fig. 4) carries the usual horizontally driven spindle 6 adapted to carry a suitable cutting tool, and contains a U-shaped slot or groove $2^a$ in which the arm 7 is mounted and held in place by suitable bolts 10 and 11. As will be evident from the drawings, the slot or groove $2^a$ extends the full depth (i. e., from front to rear) of the column, and opens upon the upper end of the column. A pinion 8 on the spindle 6 meshes with a gear 9 which drives a pinion 16 on the horizontal shaft 17 mounted in suitable bearings in the arm 7. Vertical spindle 12 receives power through beveled gear 13 meshing with beveled gear 14 on the other end of shaft 17. A detachable cover 15 permits ready access to the gears 13 and 14 for adjustment. The spindles 6 and 12 are each adapted to receive a suitable milling tool (not shown). The cutters mounted in the spindle ordinarily comprise an arbor, a cutting tool, and rings adjusting the position of the cutting tool on the arbor. An approximate adjustment of the tools can thus be obtained and then exact adjustment of the cut taken by the vertical and horizontal spindles may be made by adjusting the work on the table 5. It will be seen that by removing bolts 10 and 11 the arm 7 and vertical spindle which it carries may be removed for the substitution of a different attachment or an ordinary overarm.

In a less expensive grade of machine the arm 7 may obviously be integrally attached to the column 2.

In the modification shown in Figs. 5 to 9 inclusive, the parts 1, 2, 3, 4, 5, and 6 are identical with those enumerated above. The arm 18 is slidable as shown in Fig. 8 in the slot at the top of column 2 and is guided and clamped in position in said slot by suitable clamps 19 and clamping bolts 20. A lug 21 projecting from the side of the arm 18 engages a threaded rod 22. A bracket 23 mounted on the column 2 receives the rod 22 in a suitable bearing and also carries a shaft 24 connected to the rod 22 by beveled gearing and having a square projecting end 25 to receive a crank. A knurled disc 55 on the shaft 24 is very convenient for making small adjustments of the position of the arm 18 quickly, without stopping to get a crank.

A horizontal power shaft 26 is carried by the arm 18 and power is transmitted thereto by the pinion 27 splined to rotate with the same but free to slide thereon throughout the length of the elongated keyway 28. A gear 29 receives power from the pinion 30 on the spindle 6. The gear 29 is suitably confined between the wall of the column 2 and a collar 31. Annular plates 32 attached to the faces of the gear form a shroud for the gear teeth and engage the teeth of pinion 27, maintaining it in mesh with the gear 29 during sliding movement of the arm 18 and shaft 26.

The vertical spindle 33 is provided with suitable adjusting means. As shown, a casing 35 encloses an adjusting screw 36 held from axial movement by collars 37. A vertically slidable sleeve 38 carries a plate 39 having a projecting boss 40 engaging the screw 36. The spindle 33 carries collars 41 and 42 forcing the spindle to move with the sleeve 38. The casing 18 is split at 52 to form a spring clamp. A suitable screw 53 engages lugs 54 projecting from said casing and clamps sleeve 38 in adjusted position. A suitable collar at the bottom of the casing 35 carries a scale 43 for convenient measurement of the vertical adjustment of the spindle 33. A similar scale 55ᵃ, see Fig. 9, may be used to measure the horizontal adjustment. Power is transmitted to the spindle 33, through the beveled gears 44 and 45, the vertical shaft 46 and the spur gears 47 and 48. The spindle 33 terminates in an upwardly extending slotted shaft 49 slidable through the gear 48 but splined to it for rotary motion. A suitable casing 50 encloses the gears 47 and 48. Gears 47 and 48 are readily accessible by removal of the casing 50, and may be readily replaced by other sets of gears to vary the speed of the spindle 33. A stationary sleeve 51 forms a guide, keeping shaft 49 rigidly in alignment as it is moved up and down by vertical adjustment of the spindle 33. An aperture 56 in the lower face of the arm 18 permits easy access to gears 44 and 45, and may be closed by a suitable plate, not shown.

It should be noted that in operation a complete adjustment of the work with reference to spindle 6 may be obtained and thereafter a complete adjustment of spindle 33 with reference to the work may be made without interfering with the first adjustment. The tools may therefore be set to machine never less than two surfaces before the workman turns on the power. Where rabbets or faces with adjoining shoulders are being cut, four surfaces may be simultaneously machined and where each cutter is milling a slot, six surfaces.

In both forms of my invention the connection transmitting power to the vertical spindle, is automatically disconnected by removing the attachment, and similarly reestablished by putting the attachment back in place. In the form shown in Fig. 7 it will of course be necessary to slide pinion 27 to position over gear 29, while the arm is suspended over the column just before lowering the arm into position.

I claim as my invention:

1. A milling machine having, in combination, a column, an adjustable support for the work, a live spindle in said column, an arm projecting from the end of said column, a second live spindle in said arm, and means including readily replaceable change speed gears for driving said second spindle from said first mentioned spindle.

2. A milling machine having, in combination, a column, a power-driven spindle in said column, a detachable arm, a second spindle in said arm, a gear in said column driven from said power-driven spindle, a pinion supported by said arm and removable therewith from the column, and connections for driving the second spindle from said pinion, said pinion being adapted to mesh with said gear when said arm is mounted in position upon said column.

3. A milling machine having, in combination, a fixed live spindle, a support for the work, said support being adjustably slidable in each of three mutually perpendicular directions, and a second live spindle perpendicular to said first spindle, said second spindle being movable in a direction parallel to said first spindle back to a position above the end of said first spindle.

4. A milling machine having, in combination, a column, a fixed live spindle in said column, a support for the work, said support being adjustably slidable in each of three mutually perpendicular directions, and a second live spindle adjustably slidable in each of two mutually perpendicular directions and capable of use simultaneously with said first spindle.

5. A milling machine having, in combination, two mutually perpendicular live spindles, one of said spindles being adjustably slidable in each of two mutually perpendicular directions and the other of said spindles being fixed, and a support for the work, adjustably slidable in each of three mutually perpendicular directions.

6. A milling machine having, in combination, a column, a spindle in said column, a slidably mounted overhanging arm on said column, a shaft in said arm parallel to its direction of sliding, a pinion splined upon and slidable along said shaft, a shrouded gear in said column engaging said pinion, said gear being adapted to slide said pinion on its shaft and maintain engagement therewith during sliding motion of said arm.

7. A milling machine having, in combination, a column, a fixed spindle in said column, a slidable arm on said column, a spindle in said slidable arm mounted for sliding motion at right angles to the motion of said slidable arm, and power-driven means for driving both of said spindles.

8. A milling machine having, in combination, a column, an adjustable support for the work, an arm projecting from said column over said support, a vertically adjustable spindle carried by said arm, and a power transmission to said spindle including a pair of readily replaceable gears.

9. A milling machine having, in combination, a column, an adjustable support for the work, an arm projecting from said column over said work support, a vertically adjustable spindle carried by said arm, a gear splined to said spindle and resting on top of said arm, and a gear meshing with said first mentioned gear, said gears being readily removable and replaceable.

10. A milling machine having, in combination, a column, a U-shaped slot in said column, and an arm mounted in said slot and longitudinally slidable therein, said arm being removable from said slot by upward motion.

11. A milling machine having, in combination, a column, a work support on the column, said column having in its upper end a groove which opens upon the upper end of the column, an arm removably mounted in the groove, one end of said arm overhanging the work support, a vertical spindle in said overhanging end, and means for driving said spindle.

12. A milling machine having, in combination, a column, a work support on the column, said column having in its upper end a groove which opens upon the upper end of the column, an arm removably mounted in the groove, one end of said arm overhanging the work support, a vertical spindle in said overhanging end, a driving gear in the upper part of the column, and a gear supported by said arm in mesh with the first gear, the second gear being connected to drive the spindle.

In testimony whereof, I have hereunto set my hand.

GUSTAF DAVID SUNDSTRAND.